United States Patent [19]

Nelson

[11] 3,949,036

[45] Apr. 6, 1976

[54] STABLE BLOCKS FORMED OF SHREDDED PAPER-LIKE MATERIAL

[75] Inventor: Gerald B. Nelson, San Diego, Calif.

[73] Assignee: Papakube Corporation, San Diego, Calif.

[22] Filed: July 26, 1973

[21] Appl. No.: 382,817

[52] U.S. Cl. ................ 264/109; 428/305; 162/293; 264/120; 425/314; 425/331; 425/DIG. 230

[51] Int. Cl.[2] ............................................ B29J 5/04

[58] Field of Search ............ 264/109, 120; 425/314, 425/331, DIG. 230; 162/293; 161/161

[56] References Cited

UNITED STATES PATENTS

| | | | |
|---|---|---|---|
| 3,224,387 | 12/1965 | Forth | 425/DIG. 230 X |
| 3,225,711 | 12/1965 | Forth | 425/331 |
| 3,230,902 | 1/1966 | Grimm et al. | 425/DIG. 230 X |
| 3,232,245 | 2/1966 | Lawrence et al. | 425/331 |
| 3,354,844 | 11/1967 | Roll et al. | 425/331 |
| 3,363,587 | 1/1968 | Harrington et al. | 425/331 |
| 3,718,536 | 2/1973 | Downs et al. | 161/168 |
| 3,736,221 | 5/1973 | Evers et al. | 161/170 |
| 3,775,525 | 11/1973 | Cumpston | 264/115 |

*Primary Examiner*—Murray Tillman
*Assistant Examiner*—T. De Benedictis, Sr.
*Attorney, Agent, or Firm*—Ellsworth R. Roston

[57] ABSTRACT

A method of making a stable block from paper comprising providing a plurality of moist paper fragments, roughening the outer surface of a group of the moist paper fragments, and compressing the group of paper fragments to form the group of paper fragments into a stable block without the addition of an adhesive.

20 Claims, 6 Drawing Figures

STABLE BLOCKS FORMED OF SHREDDED PAPER-LIKE MATERIAL

BACKGROUND OF THE INVENTION

In recent years there has been a growing awareness of the need to preserve natural resources. In this regard, it has been discovered that paper, such as newspapers, can be suitably processed and reused.

To reuse paper, it is necessary to first collect the paper at numerous locations, tie it into bales, containerize the bales, and then ship it to a central plant where it is processed for reuse. One problem with this form of shipment is that the freight charges are relatively high, and this adversely effects the cost of paper recycling.

Common assignee's copending application Ser. No. 364,806, filed May 29, 1973 and now abandoned, entitled "Stable Blocks Formed of Shredded Paper-Like Material" and naming Gerald B. Nelson and William J. Prindle as inventors (said copending application being a continuation-in-part of application Ser. No. 225,122 filed on Feb. 10, 1972, and now abandoned entitled "Stable Blocks Formed of Shredded Paper-Like Material"), discloses a method for reducing the cost of paper recycling. This method involves the conversion of paper to be recycled into stable blocks. With the paper converted to block form, it can be shipped in bulk form. The freight rate for bulk products is less than for baled materials, and therefore there is a substantial freight savings. In addition, baling is eliminated. Finally, the handling charges are reduced because blocks can be loaded and unloaded by a machine.

According to this prior application, the blocks are composed of paper fragments held together by a suitable binder or adhesive. The blocks are made by shredding paper to form paper fragments, adding a water soluble adhesive to the paper fragments, and extruding the paper fragments under heat and pressure to thereby cause the adhesive to hold the fragments together in a stable block.

The blocks are shipped to a recycling plant where the paper is reused. Because the adhesive is water soluble, the blocks can be readily broken up at the recycling plant.

Although the invention of this prior application represents a substantial advance in this field, it does require the addition of adhesive in order to form a block. The adhesive reduces, to the extent that it is present, the percent by weight of each block which is composed of paper. Thus, some of the freight charges are for shipping adhesive rather than paper. In addition, the purchase of adhesive increases the cost of the block forming or cubing process.

SUMMARY OF THE INVENTION

The present invention provides a method of making stable blocks from paper fragments without the addition of adhesive. As the block is made without the addition of adhesive, the blocks consist essentially of paper fragments. A peripheral region of the block forms a hard outer shell for the block. The outer surface of the outer shell is hard and smooth and has glazed appearance.

The paper fragments from which the blocks are formed may contain ink from print applied to the paper and trace amounts of impurities. In addition, paper inherently has a moisture or water content which varies depending on ambient conditions such as humidity. Moreover, the process utilized to make the block of this invention adds an additional small quantity of moisture to the paper. However, no adhesive needs to be added. Each of the paper fragments of the blocks has substantially the same composition after being incorporated into a block as it did before being utilized in the block forming process except for the small additional amount of water added by the process of this invention. Thus, the ultimately formed block consists essentially of paper fragments.

To make a block in accordance with this invention, paper is first shredded to form paper fragments, and then the paper fragments are moistened. The outer surface of a group of the paper fragments is roughened, and such group of paper fragments is then compressed to form the block. The paper fragments are heated, and such heating preferably occurs during compression.

The roughening and compressing steps can be advantageously carried out by extruding the paper fragments through a die passage, at least a portion of the surface of which has been roughened. The outer surface of the group of paper fragments being extruded through the die passage is roughened by the rough surface. The forcing of the group of paper fragments through the die passage in an extrusion operation compresses the group of paper fragments. The heating of the paper fragments preferably occurs in the dies and may be the result of friction between the paper fragments and the surface defining the die passage.

It is important that the blocks of paper be relatively hard and stable. If the blocks do not have this characteristic, they tend to fall apart or disintegrate during handling and storage. If this occurs, the paper becomes hard to handle and generally the purpose of the block forming process is defeated.

The stability or durability of a block can be measured on a durability index of the type used at the University of California at Davis and is sometimes referred to herein as the Davis Index. This index runs from 0 to 400 with the higher readings indicating greater stability. It has been found that a block having a durability of less tha 250 on this scale is unsatisfactory. With the present invention, block durability is typically in the neighborhood of 375. Although various tests of durability could be employed, the one referred to above includes weighing the blocks, tumbling the blocks for a period of three minutes, and then weighing the blocks a second time. Any disintegration or falling apart of the blocks is represented in a weight loss.

To facilitate transport and storage, the blocks are preferably quite dense. With the present invention, the unit density of the blocks typically ranges from 45 lbs. to 70 lbs. per cubic foot. Unit density is calculated by measuring the volume of one block, weighing that block, and then mathematically determining the weight of an identical block having a volume of 1 cubic foot.

If the surface of the die passage does not roughen the outer surface of the group of paper fragments therein, a sufficiently stable block cannot be made without the addition of an adhesive. However, by roughening at least a portion of the surface of the die passage, a stable block can be extruded even though no adhesive is added.

It is not known why roughening produces this result. However, one theory is that roughening the outer surface of the ultimately formed block interrupts the paper fragments and forms numerous tentacles or fibers which are interlocked as a result of the heat and pressure applied to the paper fragments in the die. In addition, the moistening of the paper fragments and the subsequent heating and compression may cause some of the natural lignin in the paper to act as an adhesive. As explained in the above mentioned patent application, ligninsulfonate resin is a suitable binder for paper fragments. Applicant does not wish to be bound by any particular theory.

The rough die surface may defined all or a portion of the surface of the die passage. However, the rough surface should circumscribe the die passage. If only a portion of the die surface is roughened, it can be located anywhere between the inlet and outlet of the die passage. However, for optimum results, the rough surface should be located adjacent the inlet of the die passage, and the surface of the die passage adjacent the outlet should be relatively smooth. When so constructed, the disruption or roughening of the paper fragments occurs at the beginning of the extrusion operation, and the smoother downstream die surfaces are thereafter operative to provide a hard, smooth, glazed appearance to the outer surface of the surface of the block.

The roughened die surface may be provided in different ways. However, the die is preferably relieved in the areas which are to be roughened, and the relieved areas subsequently filled with an appropriate rough material. The rough material should be relatively hard and not readily polish during ordinary usage. The rough material should be self-cleaning in that the cavities defined by the surface irregularities should not readily fill the paper during an extrusion operation. By way of example, a preferred range of surface finishes for the rough surface may be of the order of 70 to 180 microinches. By way of contrast, the smooth portion of the die passage is preferably polished and preferably has a surface finish of the order of 3 to 7 microinch finish.

It is important that the paper fragments be thoroughly moistened prior to extrusion. Unfortunately, paper fragments have a tendency to mat or be retained together in chunks. This tendency inhibits thorough wetting of all of the paper fragments.

To assure proper wetting of the paper fragments, the present invention provides for fluffing of the paper fragments, and then allowing the fluffed fragments to fall under the influence of gravity. As the paper fragments fall, they are sprayed at several locations with an appropriate nonadhesive moistening agent such as water. This assures that substantially all of the paper fragments will be properly moistened.

The fluffing operation can advantageously be carried out by a pickup conveyor which removes the paper fragments from a first conveyor therebelow. The pickup conveyor extends upwardly from the first conveyor. The pickup conveyor has projecting members thereon which tend to breakup any chunks or mats of paper fragments. When the paper fragments reach the upper end of the pickup conveyor, they fall off such conveyor and are sprayed with the nonadhesive moistening agent.

The paper fragments are supplied to the first conveyor, and the height of the paper fragments on this conveyor is controlled with appropriate sensing equipment. A baffle is provided adjacent the pickup conveyor to assure that the paper fragments are first deposited on the first conveyor and thereafter picked up by the pickup conveyor. A rotatable member beneath the pickup unit and adjacent one end of the first conveyor removes from the first conveyor any paper fragments which the pickup conveyor may miss.

Although it is desirable to keep the paper fragments in a loose fluffed state prior to moistening, it is desirable to compact the moist paper fragments prior to extrusion. By compacting the paper fragments prior to extrusion, the production capacity of the block forming equipment can be increased. With the present invention, this is accomplished, in part, by a movable member which compacts the moist paper fragments en route to the extruder. Additional compaction is obtained by an endless belt which frictionally, forcibly loads the moist paper fragments into a receiving section of the extruder. The compacted moist paper fragments are then extruded through the die passages as described hereinabove to form the stable blocks.

The invention can best be understood by reference to the following description taken in connection with the accompanying illustrative drawing.

DESCRIPTION OF THE PREFERRED EMBODIMENT

Figure 1:
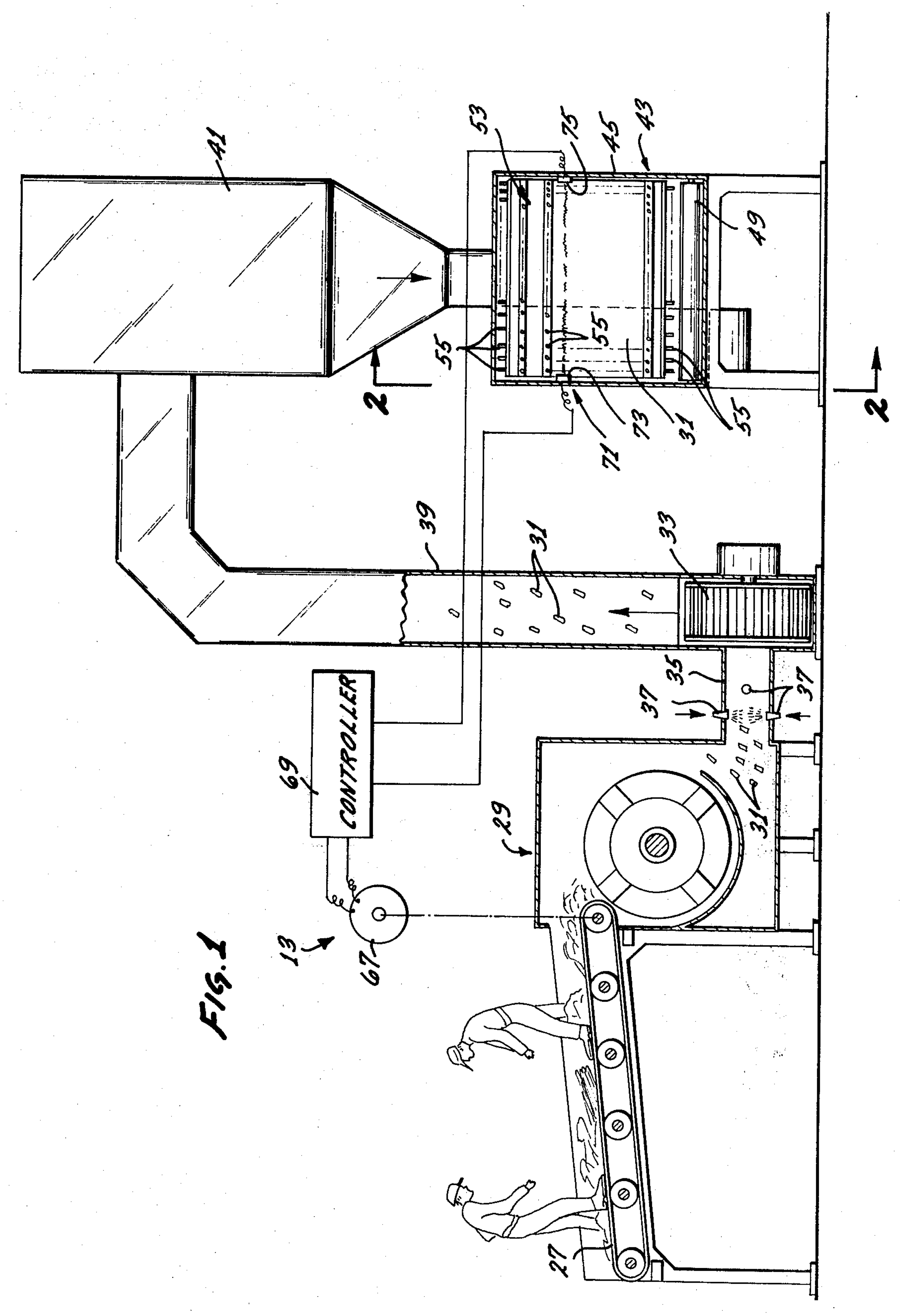
FIG. 1 is a schematic view of an apparatus for carrying out a process in accordance with the teachings of this invention.
Figure 2:
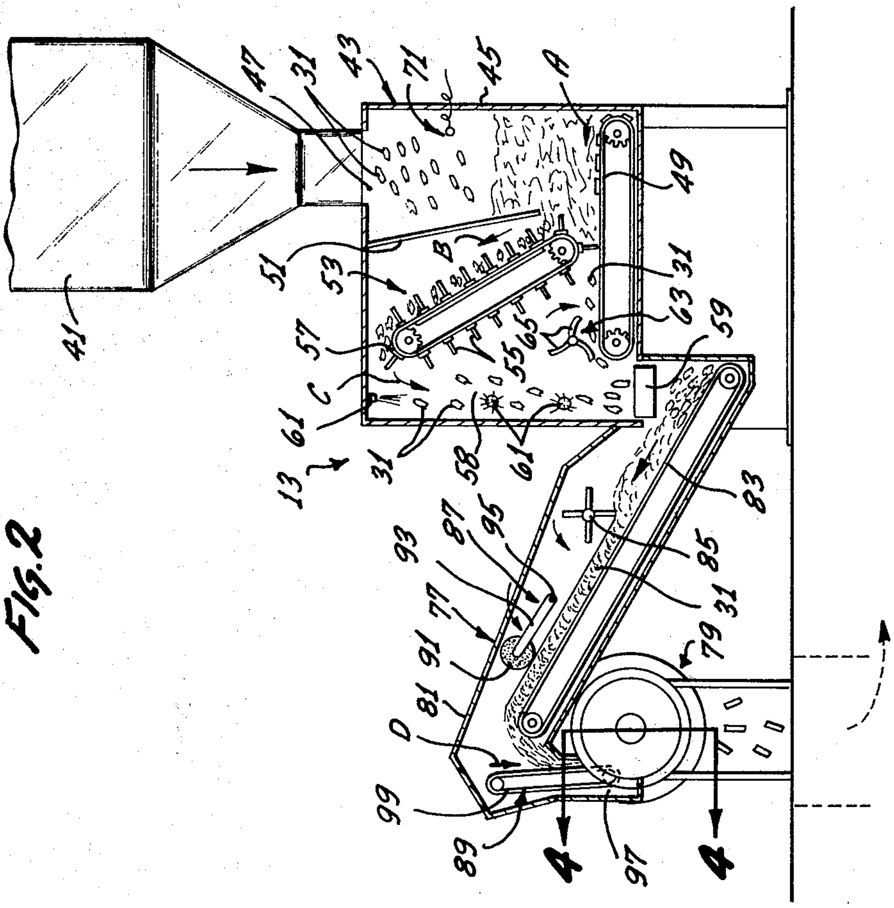
FIG. 2 is a sectional view taken generaly along line 2—2 of FIG. 1.
Figure 3:
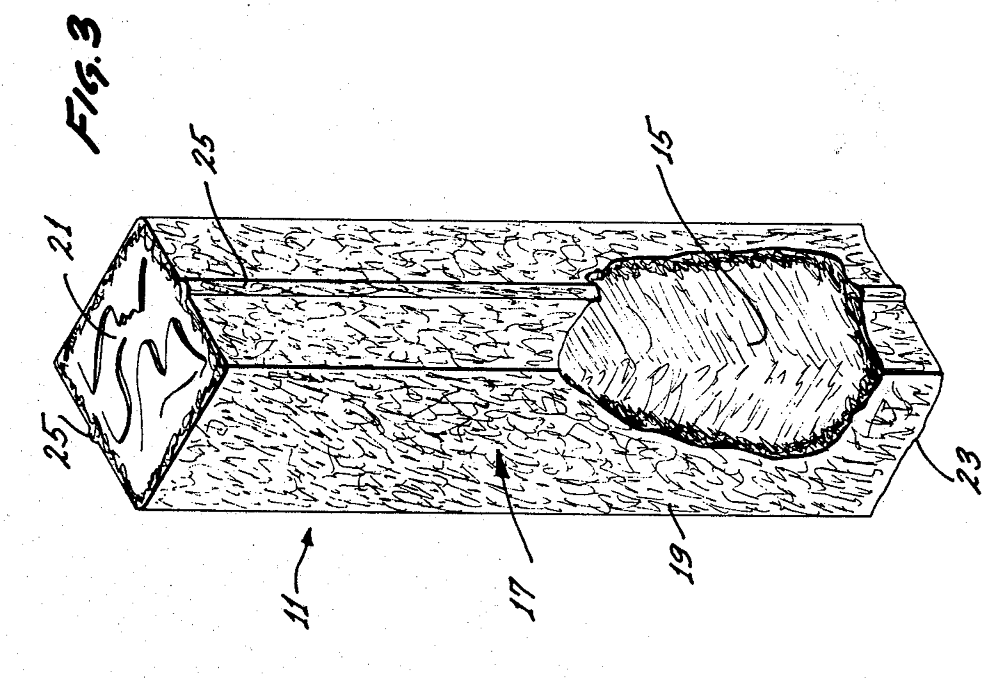
FIG. 3 is a perspective view of a block constructed in accordance with the teachings of this invention.
Figure 4:
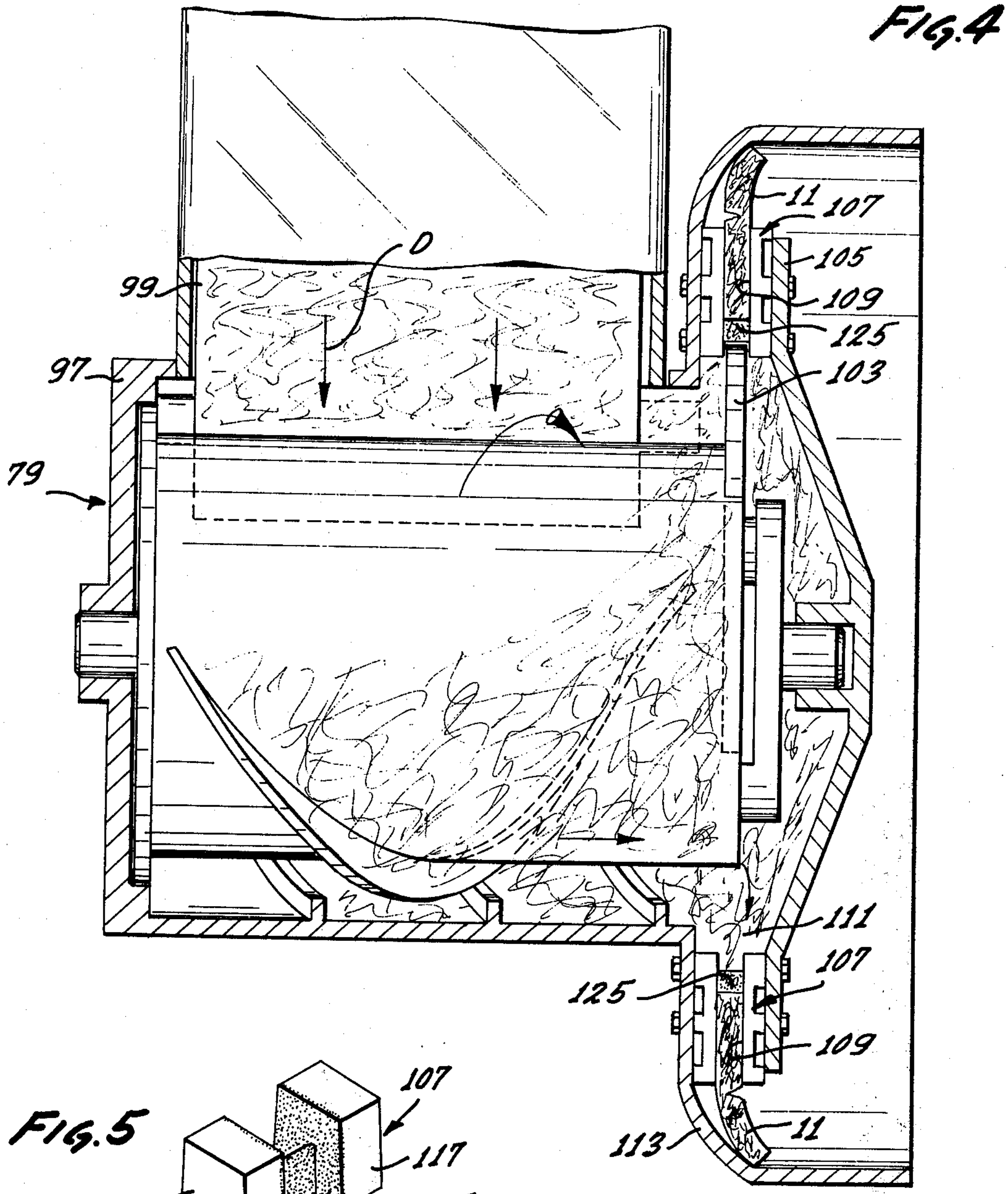
FIG. 4 is an enlarged, fragmentary, sectional view taken generally along line 4—4 of FIG. 2 and showing a portion of the extruder and the endless belt for forcing the moist paper fragments into the extruder.

FIG. 3 shows a stable block 11 of the type which can be made with a block forming apparatus 13 shown in FIGS. 1, 2 and 4–6. Although the block 11 may be of different configurations, in the embodiment illustrated, it is generally in the form of a rectangular solid. The dimensions of the block 11 can be varied and may be, for example, a few inches in length and about 1¼ inch by 1¼ inch in cross section.

Except for trace amount of impurities or contaminants and for a slightly increased moisture content, the block 11 is formed entirely from paper fragments packed tightly together. Of coursee, the paper fragments may contain ink or materials used for writing or printing on the paper. However, in making the block 11, no adhesive is added to the paper fragments.

By way of example, the paper fragments used to make the block 11 may initially have from 8% to 9% water depending upon atmospheric conditions. Of course, on a very damp day or a very dry day, the percent of moisture inherently in the paper fragments will be out of this range. The block 11, after surface moisture has evaporated, may have from 12% to 15% by weight of water. Thus, the amount of water present in the block 11 as a result of the process of this invention may typically range from 3% to 7% by weight. As substantially the only effect of the process of this invention is to very slightly increase the percent of water in the paper fragments, the block 11 consists essentially of paper fragments packed tightly together.

The paper fragments of the block 11 are packed as closely and tightly together as possible to thereby minimize internal voids. The block 11 is solid and substantially homogenous. The block 11 is rigid and will retain its shape during normal handling and transport. The unit density of the block is about 45 lbs. to 70 lbs. per cubic foot.

The block 11 has an interior region 15 and a peripheral region or shell 17 circumscribing the inner region. The shell 17 is relatively hard and has a smooth, hard outer surface 19 which has a shiny or glazed appearance. The block 11 has end faces 21 and 23. The end faces 21 and 23 are not as hard and smooth as the outer surface 19 and do not have a glazed appearance. Although the block 11 can be of various configurations, in the embodiment illustrated, it is generally in the form of a rectangular solid. In the embodiment illustrated, the block 11 is formed in an extrusion process. This results in the formation of parallel beads 25 extending longitudinally on opposed sidewalls of the block. The beads 25 are merely the results of employing a split extrusion die and are not essential and form no part of the present invention.

The block 11 is, in effect, case hardened at the outer surface 19. Although some of the paper fragments of the block 11 may be adhered together at locations in the interior region 15 (FIG. 3), the primary adhesion occurs in the peripheral region 17.

The process for making the block 11 can advantageously be carried out on the apparatus 13. The process includes first sorting from collected material the paper which is suitable for recylcing and disposing of any contaminants, i.e., material not suitable for recycling. The paper suitable for recycling may be, for example, newspaper; however, other kinds of paper including paper of the type commonly used for magazines can also be used. The sorting function may be carried out manually on a sorting table or conveyor 27 which conveys the paper through a sorting station.

The paper suitable for recycling is transported by the sorting table 27 to a shredder 29. The shredder 29 shreds the paper to form paper fragments 31. The shredder 29 may, for example, be of the type shown in U.S. Pat. No. 3,524,597. The process of this invention is not dependent upon the paper fragments 31 being of any particular size or gradation. However, the paper fragments 31 are preferably not so small that they form dust. On the other hand, the paper fragments 31 should be sufficiently small so that they will "flow", i.e., be readily conveyable at a regulated rate.

Next, the paper fragments 31 are drawn by a fan 33 out of the shredder 29 and through a conduit 35. As the paper fragments 31 pass through the conduit 35, they are sprayed with a moistening agent such as water by a plurality of nozzles 37 (three being shown in FIG. 1). The nozzles 37 wet the paper fragments 31 and reduce the dust that would result from the very fine paper fragments 31 produced by the shredder 29.

The conduit 35 terminates in the inlet of the fan 33. The fan 33 forces the paper fragments 31 upwardly through a vertical duct 39 to a cyclone 41 which separates the air from the paper fragments 31. The air is allowed to escape upwardly into the atmosphere and the paper fragments 31 fall down through the cyclone 41 to a regulator 43. The fan 33 and the cyclone 41 may be a standard air conveying system.

The regulator 43 is similar to the type of regulator employed in alfafa cubing devices. The primary function of regulators of this type is to regulate the flow of product. However, the regulator 43 also fluffs and moistens the paper fragments.

The regulator 43 (FIGS. 1 and 2) includes a housing 45 having an opening 47 through which the paper fragments 31 enter the regulator. As best shown in FIG. 2, an endless conveyor 49 is mounted within the housing 45 and moves in the direction of the arrow A to thereby convey the paper fragments 31 to the left as viewed in FIG. 2. The conveyor 49 is horizontal and conveys the paper fragments 31 along a horizontal path. A fixed baffle 51 is mounted on the upper wall of the housing 45 and extends downwardly toward the conveyor 49. The baffle 51 is inclined to the right as it extends downwardly and it terminates above the conveyor 49.

A pickup conveyor 53 which moves in the direction of the arrow B in FIG. 2 is mounted within the housing 45. The conveyor 53 conveys the paper fragments along a path which extends upwardly and to the left as viewed in FIG. 2 to thereby define an obtuse angle with the horizontal path defined by the conveyor 49. The pickup conveyor 53 includes a plurality of spaced projections or fingers 55 which move with the conveyor 53. The fingers 55 contact the paper fragments 31 and tend to break up mats or chunks of the fragments. Thus, the fingers 55 tends to fluff the paper fragments 31. The number and orientation of the fingers 55 can be varied. However, the fingers 55 are preferably close enough together so that paper fragments will not too readily fall between them.

One advantage of inclining the path B relative to the path A is that a change of direction of the paper fragments 31 tends to pull them apart to further avoid matting or chunking of the fragments. In addition, a more constant flow rate of paper fragments out of the regulator 43 is obtained with the inclined pickup conveyor 53.

The pickup conveyor 53 not only fluffs the paper fragments 31 but also picks them off of the conveyor 49 and conveys them in the direction of arrow B in FIG. 2 to the upper end 57 of the pickup conveyor. The paper fragments 31 so conveyed then fall off the end of the pickup conveyor 53 and fall downwardly generally in the direction of the arrow C in FIG. 2 through an open zone 58 and toward an outlet 59 in the bottom wall of the regulator 43. A plurality of spray nozzles 61 are mounted on the housing 45 and arranged to direct a spray of liquid into the zone 58 and into the path of the paper fragments 31 which have dropped off of the upper end 57 of the pickup conveyor 53. The paper fragments 31 tend to loosen further as they fall. This assures that the paper fragments 31 will not be matted or chunked together as they move through the spray provided by the nozzles 61. Accordingly, thorough wetting of the paper fragments 31 is obtained.

The number and arrangement of the nozzles 61 can be varied by those skilled in the art. In the embodiment illustrated, one of the nozzles 61 is mounted on the top wall of the housing 41 and directs a spray of water downwardly into the zone 58. Two of the nozzles 61 are mounted in vertically spaced relationship on one of the sidewalls of the housing 45 and provide spray patterns having generally horizontal axes.

In the embodiment illustrated, the liquid supplied by the nozzle 61 is water. No adhesive is added to the paper fragments 31. Although some water is sprayed on the paper fragments 31 by the nozzles 37, these nozzles are not essential and can be omitted. When the nozzles 37 are utilized, the large majority of water added is preferably added by the nozzle 61. For example, approximately 65% by weight of the water added can be added by the nozzles 61; however, the ratio of water added by the nozzles 37 and 61 is not critical and can be widely varied.

A rotatable member 63 is rotatably mounted within the housing 45 slightly above the downstream end (the left end as viewed in FIG. 2) of the conveyor 49. The rotatable member 63 includes a plurality of radially extending, axially spaced fingers or prongs 65 which engage any paper fragments 31 which may be conveyed past the lower end of the pickup conveyor 53 by the conveyor 49. The rotatable member 63 pushes such paper fragments 31 into the zone 58 where they are moistened. In actual practice of the invention, the majority of the paper fragments 31 are picked up by the pickup conveyor 53.

The regulator 43 controls the production of the blocks 11 by controlling the operation of a motor 67 (FIG. 1) which drives the sorting table 27. The motor 67 is controlled by a motor controller 69 which in turn is controlled by a height sensor 71 which is mounted on the regulator 43. Although the height sensor 71 could be of different constructions, in the embodiment illustrated, it includes a sound transmitter 73 and a sound receiver 75 located in alignment on opposite side walls of the housing 45 at equal distances above the bottom wall of the housing. When the level of the paper fragments 31 is below the sensor 71 the sound transmitted by the transmitter 73 is received by the receiver 75, and the controller 69 causes the motor 67 to operate. However, if the height of the paper fragments 31 in the regulator 43 rises above the sensor 71, the paper fragments prevent receipt of the sound signal by the receiver 75 and the controller 69 responds by turning off the motor 67. The shredder 29 and the fan 33 run continously; however, with the motor 67 turned off, no additional paper is supplied to the shredder 29.

The paper fragments 31 fall through the outlet 59 into a conveying and compacting section 77 which conveys the paper fragments to the extruder or cuber 79. The section 77 includes a housing 81, an endless conveyor 83, a leverler 85, and compactors 87 and 89. The conveyor 83 extends upwardly as it moves the fragments 31 to the extruder 79 so that it can deposit the fragments in the upper end of the extruder. The leveler 85 rotates in the direction of the arrow in FIG. 2 to level out the paper fragments 31 on the conveyor 83.

The compactor 87 cooperates with the conveyor 83 to provide a first stage compaction of the moistened paper fragments 31. In the embodiment illustrated, the compactor 87 includes a roller 91 suitably rotatably mounted on a frame 93 which in turn is mounted on the housing 81 for pivotal movement about a pivot axis 95. The roller 91 and the frame 93 tend to pivot counterclockwise as viewed in FIG. 2 under the influence of gravity. Accordingly, the degree of compaction of the paper fragments is a function of the weight of the roller 91 and the frame 93.

The extruder 79 has a receiving section 97 into the upper end of which compacted moist paper fragments 31 are delivered by the conveyor 83. The extruder 79 may be of the type, for example, that is commonly used in extruding alfalfa cubes. The compactor 89 further compacts the paper fragments entering the receiving section 97. Specifically, the compactor 89 in the embodiment illustrated includes an endless belt 99 which extends from an elevation adjacent the upper end of the conveyor 83 to a location within the receiving section 97. The belt 99 is driven in the direction of the arrows D in FIGS. 2 and 4 so that the side of the belt near the center axis of the receiving section 97 moves downwardly into the receiving section, and the opposite side of the belt near the outer periphery of the receiving section moves upwardly. The downwardly moving portion of the belt 99 frictionally engages the paper fragments 31 and tends to compact them in the receiving section 97. The type of compaction that is achieved by the belt 99 and the roller 91 is an elimination of much of the air and void space between paper fragments rather than a high degree of compression which is achieved in the extrusion operation. By reducing the volume of air in this manner, the production rate of the apparatus 13 is increased.

Figure 6:
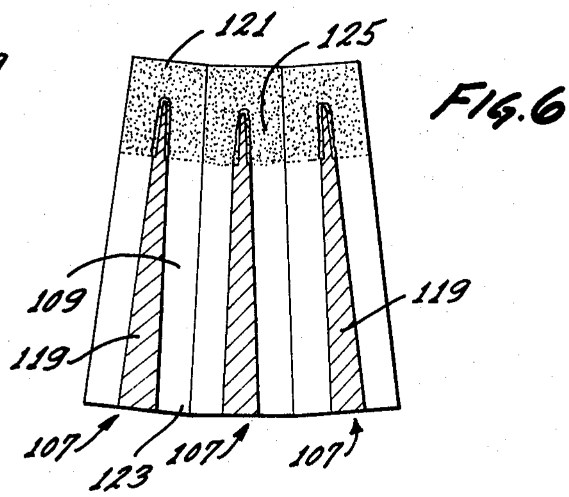
FIG. 6 is a sectional view through three of the die sections.

The extruder 79 includes an auger 101 mounted for rotation. The auger 101 moves the compact moist paper fragments supplied to the receiving section 97 toward an eccentric 103 and a die ring 105. In the embodiment illustrated, the eccentric 103 is mounted for rotation with the auger 101 and the die ring 105 is stationary. A plurality of dies or die sections 107 are fixedly mounted on the die ring 105. Each adjacent pair of dies 107 forms a die passage 109 as shown in FIG. 6. As the auger 101 rotates, it moves the paper fragments 31 into the space 111 between the periphery of the eccentric 103 and the dies 107. Because the eccentric 103 is eccentrically mounted, the space 111 moves around the inner periphery of the dies 107 as the eccentric rotates. Stated differently, the eccentric 103 forces or extrudes groups of the paper fragments 31 through each of the die passages 109 to therby form the blocks 11. In the embodiment illustrated, the blocks 11 are broken off by being forced against a stationary cam 113.

Figure 5:
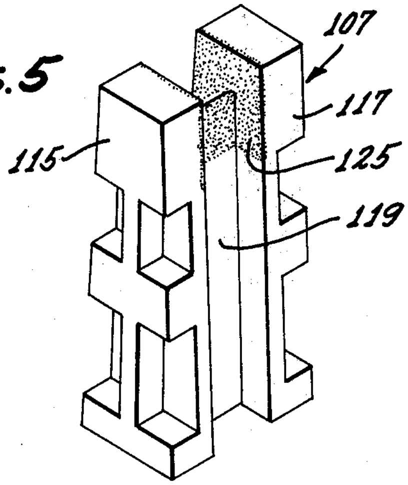
FIG. 5 is a perspective view of one of the die sections of the extruder.

The details of the dies can best be seen in FIGS. 5 and 6. Each of the dies 107 is identical and includes an identical pair of block sections 115 and 117 having notched outer side surfaces and a web 119 integrally joining the two block sections. As shown in FIG. 6, the webs 119 progressively thicken from an inlet 121 of the die passage 109 to an outlet 123 of the die passage.

Each of the die passages 109 has a rough surface 125 adjacent the inlet 121. The rough surface circumscribes a region of the die passage 109, i.e., around the die passage 109. The surface finish of the rough portion may be of the order of 70 to 180 microinches.

The rough portion 125 may be defined by cutting away a zone of the die which is to be roughened and filling this zone with a rough material. The rough material should be hard and self-cleaning, i.e., the voids must be sufficiently shallow so as not to fill up with paper during use. In addition, the rough material should not polish readily in use. Materials known as hard facing materials are suitable for this purpose. One such material is tungsten-carbide matrix. This material is used for repairing dies used for cubing alfalfa and is available from the Haines Company under the designation Haines hard facing 4E with 200 grit.

All of the surfaces of the die passage 109 except for the rough portion 125 are smooth and polished. In the embodiment illustrated this latter portion of the surface is also chrome plated. By way of example, the die passage 109 may have a length of about 7 inches, and the rough portion may begin at the inlet 121 and extend into the die passage for about one inch.

Dimensionally, the die passage of 109 remains the same as it extends toward the outlet 123. The addition of the rough material to form the rough portion 125 may result in this portion of the die passage being slightly smaller in cross sectional area than it would have been without the addition of the rough material.

As a group of paper fragments are forced into the die passage 109 by the eccentric 103, the outer surface of this group is roughened by sliding contact with the rough portion 125. Simultaneously, the group of paper fragments 31 in the die passage 109 are compressed. The roughening of the outer surface of the paper fragments in the die passage 109 provides numerous small fibers or tentacles which become intertwined and are forcibily pressed together as the group of paper fragments 31 moves further toward the outlet 123.

The paper fragments 31 are under a pressure of from about 5,000 psi to about 10,000 psi as they are extruded through the die passage 109. The die passages 109 are preferably heated to a temperature of 125° to about 200° so that they apply heat to the paper fragments 31 during extrusion. Although the dies 107 may be preheated by an external source (not shown, the friction between the dies and the paper fragments 31 will, after a short period of operation, heat the dies to a temperature within this range so that preheating is not essential to obtain the desired operating temperature of the dies.

Following the extrusion operation, the moisture at the exposed surfaces of the block 11 evaporates. As no adhesive has been added to the block 11, the block consists essentially of the paper fragments. The voids caused by evaporation of the water are minimal. The glaze on the outer surfaces 19 of the block 11 is formed by rubbing contact of this surface against the surface of the die passage 109.

Although exemplary embodiments of this invention have been shown and described, many changes, modifications and substitutions may be made by those having ordinary skill in the art without necessarily departing from the spirit and scope of this invention.

I claim:

1. A method of making stable blocks from paper comprising:

- providing a plurality of moist paper fragments;
- compacting the moist paper fragments in the plurality;
- dividing into compact groups the compacted and moist paper fragments in the plurality;
- roughening the compacted and moist paper fragments in each compact group at the periphery of each such compact group;
- compressing the moist and compacted paper fragments in each compact group to form said compact groups of moist and compacted paper fragments into stable blocks.

2. A method as defined in claim 1 wherein said step of roughening is carried out during said step of compressing.

3. A method as defined in claim 1 wherein said step of compressing is carried out subsequent to said step of roughening.

4. A method as defined in claim 1 wherein the paper fragments include a lignin having properties of providing an adhesive and wherein said method is carried out by using only the lignin in the paper fragments as an adhesive.

5. A method as defined in claim 1 wherein said step of providing includes providing the paper fragments in the plurality, fluffing the paper fragments in the plurality to prevent the paper fragments from being retained together in chunks, and moistening the fluffed paper fragments in the plurality.

6. A method of making a stable block from paper comprising:

- providing a plurality of moist paper fragments;
- providing a die having a surface defining a die passage which extends through the die, said die passage having a roughened inlet and an outlet; and
- extruding the moist paper fragments in the plurality through said die passage from said roughened inlet to said outlet to form a stable block of paper.

7. A method as defined in claim 6 wherein the paper fragments in the plurality include lignin having properties of providing an adhesive and the lignin acts as an adhesive during the extrusion of the moist paper fragments in the plurality through the die passage to cause the paper fragments in the plurality to be retained in the stable block.

8. A method as defined in claim 6 wherein the extrusion occurs under heat and pressure to compress the moist paper fragments in the plurality and cause the lignin in such paper fragments to adhere such paper fragments during the application of such heat and pressure.

9. A method as defined in claim 6 wherein said surface of said outlet has a surface finish of in the order of 3 to 7 microinches and the roughened surface of the inlet has a surface finish in the order of 70 to 180 microinches.

10. A method of making stable blocks from paper comprising:

- providing a plurality of paper fragments;
- fluffing the paper fragments in the plurality to substantially prevent the paper fragments being retained together in chunks;
- moistening the fluffed paper fragments in the plurality;
- compacting the moistened paper fragments in the plurality;
- separating into compacted groups the moistened and compacted paper fragments in the plurality;
- roughening the moistened and compacted paper fragments in each compacted group at the periphery of each compacted group; and
- extruding each group of the moistened and compacted paper fragments to form stable blocks.

11. A method as defined in claim 10 wherein said step of moistening includes forming a spray of a liquid and dropping the fluffed paper fragments through said spray.

12. A method as defined in claim 10 wherein said step of compacting includes squeezing the moistened paper fragments in the plurality between a member and a conveyor.

13. A method as defined in claim 10 wherein said step of extruding includes providing a die having a surface defining at least one die passage which extends through the die, said die passage having a roughened inlet and further having an outlet for directing the moistened and compacted paper fragments in at least one of the groups through said passage in the die from said inlet to said outlet to form a stable block of paper.

14. A method as defined in claim 10 wherein the step of extruding causes a pressure in the order of 5000 to 10,000 pounds per square inch to be applied to the compacted and moistened paper fragments in each compacted group.

15. A method as defined in claim 13 wherein said passage of said die has a surface finish in the order of 70 to 180 microinches at the inlet and has a surface finish in the order of 3 to 7 microinches at the outlet.

16. A method as defined in claim 1 wherein the paper fragments have fibers and wherein said step of roughening causes the fibers in the compacted and moist paper fragments in each compacted group to become interlocked.

17. A method as defined in claim 6 wherein said inlet of said die passage is provided with a surface finish in the order of 70 microinches to 180 microinches.

18. A method as defined in claim 17 wherein the compacted and moist paper fragments in the plurality are compressed at a pressure in the order of 5000 pounds per square inch to 10,000 pounds per square inch while passing through the die passage.

19. A method as defined in claim 18 wherein the compacted and moist paper fragments in the plurality are heated to a temperature in the order of 125° F. to 200° F. while they are being passed through the die passage.

20. A method as defined in claim 9 wherein said paper fragments in the plurality are subjected to a pressure in the order of 5000 pounds per square inch to 10,000 pounds per square inch and a temperature in the order of 125° F. to 200° F. during the extrusion of such paper fragments through the die passage.

* * * * *